United States Patent
Heim et al.

[11] Patent Number: 5,772,267
[45] Date of Patent: Jun. 30, 1998

[54] COLLISION DAMPER FOR MOTOR VEHICLES

[75] Inventors: Gunther Heim, Mainhausen; Stephan Schütt, Rüsselsheim; Jürgen Hock, Aschaffenburg, all of Germany

[73] Assignee: Ymos Aktiengesellschaft Industrieprodukte, Obertshausen, Germany

[21] Appl. No.: 685,872

[22] Filed: Jul. 24, 1996

[30]   Foreign Application Priority Data

Jul. 24, 1995 [DE] Germany ................. 195 26 707.9

[51] Int. Cl.[6] ................................. B60R 19/06
[52] U.S. Cl. ................................. 293/133; 293/132
[58] Field of Search .................. 293/132, 133; 188/371, 377

[56] References Cited

U.S. PATENT DOCUMENTS

| | | | |
|---|---|---|---|
| 3,134,585 | 5/1964 | Trask | 267/1 |
| 3,759,351 | 9/1973 | Purple | 188/377 |
| 3,998,485 | 12/1976 | Putter et al. | 293/70 |
| 4,023,652 | 5/1977 | Torke | 188/377 |
| 4,152,012 | 5/1979 | Reidelbach et al. | 280/784 |
| 5,199,755 | 4/1993 | Gertz | 293/120 |
| 5,201,912 | 4/1993 | Terada et al. | 293/120 |
| 5,248,129 | 9/1993 | Gertz | 256/13.1 |
| 5,462,144 | 10/1995 | Guardiola et al. | 188/377 |

FOREIGN PATENT DOCUMENTS

| | | |
|---|---|---|
| 0 169 747 | 5/1985 | European Pat. Off. . |
| 42 04 826 | 2/1992 | Germany . |
| 6-227333 | 2/1993 | Japan . |
| WO 94/27841 | 5/1994 | WIPO . |

*Primary Examiner*—Joseph D. Pape
*Attorney, Agent, or Firm*—Spencer & Frank

[57] ABSTRACT

A collision damping arrangement for absorbing energy in a possible head-on and/or rear end collision of a motor vehicle, having respectively a bumper-side cross member (1; 18) and longitudinal members (4, 5; 19) which are arranged on the cross member and which are also connected to the corresponding passenger compartment, with at least one collision damper (2, 3; 15, 16; 17) being arranged on a respective longitudinal member (4, 5; 19). In order to permit the collision damper (2, 3; 15, 16; 17) to be produced in a straightforward manner and at reasonable cost, and a precise matching of a predeterminable collision behavior of the vehicle in a simple manner, the collision damper (2, 3; 15, 16; 17) is comprised of an extruded section whose profile extends transversely to the longitudinal axis (6) of the longitudinal member (4, 5; 19) for the motor vehicle.

19 Claims, 5 Drawing Sheets

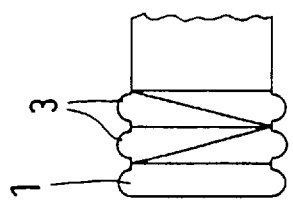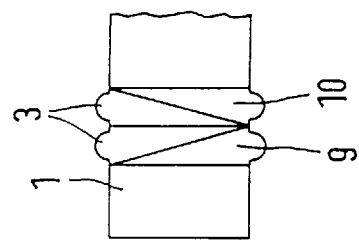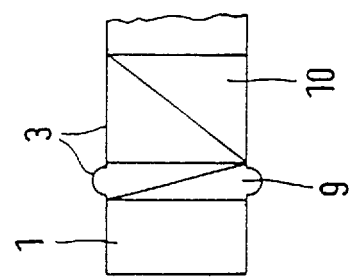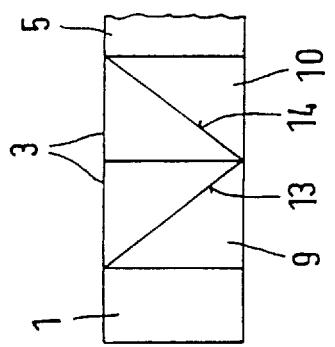

COLLISION DAMPER FOR MOTOR VEHICLES

REFERENCE TO RELATED APPLICATIONS

This application claims the priority of German application Serial No. 195 26 707.9, filed Jul. 24, 1995, which is incorporated herein by reference.

BACKGROUND OF THE INVENTION

The invention relates to a collision damping arrangement for absorbing energy in a possible head-on and/or rear end collision of a motor vehicle. More particularly, the present invention, relates to such a collision damping arrangement which is of the type comprising a bumper-side cross member, a plurality of longitudinal members arranged on the cross member and connected or connectable to the passenger compartment of a motor vehicle, and at least one collision damper arranged on each longitudinal member.

In order to protect the occupants of a motor vehicle during a head-on or rear end collision, it is known to embody the longitudinal members, which are arranged on the bumper-side cross members and which, in turn, are connected with the passenger compartment, in such a manner that they absorb the energy released by the impact by way of deformation. Such a deformation can be accomplished, on the one hand, in that the longitudinal members are curved, with the bending moment generated during the collision resulting in a deformation of the longitudinal member and the deformation points being determined by the selection of the cross sections. On the other hand, a deformation of the longitudinal members can also be brought about by beading of the longitudinal members in the longitudinal direction.

Collision dampers of the above-mentioned type, in which essentially only the longitudinal members themselves form the respective collision damper, are relatively expensive to produce. Since the collision dampers must also absorb an impact in the low speed range (e. g., at 10 km/h), the longitudinal members must be replaced after collisions with corresponding frequency, a process which is extremely time-consuming and expensive.

Furthermore, collision dampers have become known which are respectively comprised of a relatively short hollow section (so-called crashboxes) and which are used in-between the corresponding bumper-side cross members and the associated longitudinal members. Usually, these hollow sections are also made from sheet metal pieces. In these collision dampers or, the hollow space of the profile extends in the longitudinal direction of the longitudinal member, with a matching of the collision behavior of the vehicle implemented primarily by way of the shape of the hollow section and the wall thickness of the sheet metal pieces. It is very expensive to produce the appropriate hollow sections because the sheet metal pieces must be punched out and they must then be connected with one another by means of spot welding. Furthermore, such collision dampers do not allow a precise, speed-dependent matching of the collision behavior of the respective motor vehicle.

From DE 42 04 826 A1, it is known to use gusset elements for the cost-advantageous connection of hollow profiles; the gusset elements are also embodied as hollow sections and are produced by means of extrusion. on the one hand, such gusset elements can be produced in a cost-advantageous manner and, on the other, they possess a high degree of rigidity.

SUMMARY OF THE INVENTION

It is the object of the invention to provide a collision damping arrangement with a collision damper of the type mentioned at the outset which can be produced in a straightforward manner and at reasonable cost and which allows a precise matching of a predeterminable collision behavior of the vehicle in a simple manner.

The above object is achieved according to the present invention by a collision damping arrangement for absorbing energy in a possible head-on and/or rear end collision of a motor vehicle, comprising a bumper-side cross member; a plurality of longitudinal members arranged on the cross member and connected or connectable to a corresponding passenger compartment of a motor vehicle; and at least one collision damper for absorbing energy arranged on each longitudinal member, with the collision damper comprising an extruded section whose constant cross-sectional profile extends transversely to the longitudinal axis of the associated longitudinal member for the motor vehicle. Further particularly advantageous embodiments and features of the invention are disclosed.

The invention is essentially based on the concept that the collision damper is comprised of an extruded section, preferably made of aluminum or an aluminum alloy, whose cross-sectional profile extends transversely to the longitudinal axis of the longitudinal member (transversely molded extruded section).

The collision dampers according to the invention can be produced in a straightforward and cost-advantageous manner by cutting a corresponding extruded section into lengths. By orienting the profile transversely to the longitudinal direction of the longitudinal member, the collision damper can be very precisely adapted to the desired collision behavior of the vehicle, even in the low speed range, by a corresponding number of hollow chambers disposed next to one another and by the shaping of the profile and by the wall thickness of the section walls and of possible stiffening ribs.

BRIEF DESCRIPTION OF THE DRAWINGS

Further details and advantages of the invention ensue from the embodiments described below which are explained by use of the figures wherein:

FIGS. 2 to 5, each show a side view of the arrangement illustrated in FIG. 1 in different collision situations;

DETAILED DESCRIPTION OF THE PREFERRED EMBODIMENT

Figure 1:
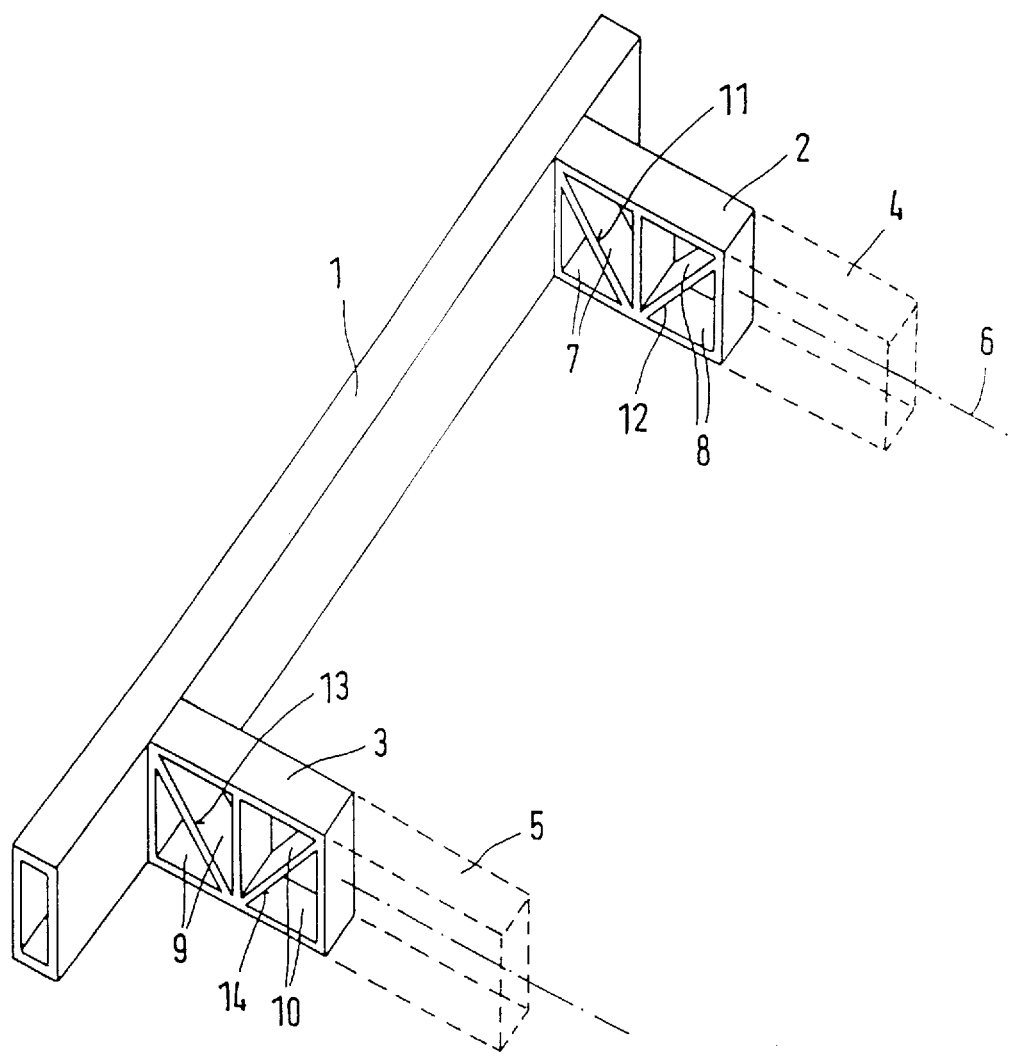
FIG. 1 is a perspective view of a first embodiment of two collision dampers (crashboxes) according to the invention arranged in-between the cross member and two longitudinal members of a motor vehicle.

In FIG. 1, a cross member of a motor vehicle bumper, which cross member is embodied as a hollow section, is identified by 1. Longitudinal members 4 and 5 are arranged or mounted on the cross member 1 via collision dampers 2, 3 according to the invention which are comprised of an aluminum alloy. The longitudinal members 4,5 extend up to the passenger compartment which is not shown for the sake of clarity.

The collision dampers 2, 3 are extruded hollow sections, whose constant cross-sectional profiles extend transversely to the longitudinal axis 6 of the respective longitudinal member 4, 5. The hollow section of each damper 2,3 essentially comprised of two chambers 7, 8 or 9, 10, which are preferably square or rectangular as shown and are arranged next to one another in the direction of the longitudinal axis 6, and which are respectively stiffened by stiffening ribs 11–14, which as illustrated preferably extend in the diagonal direction of the respective chamber.

The functioning of the collision dampers 2,3 according to the invention is illustrated in FIGS. 2 to 5. Of these, FIG. 2 reflects the normal case (collision damper without load). In the example shown in FIG. 3, an impact of the corresponding vehicle occurred against a rigid wall at a speed of 5 km/h. The wall thicknesses of chambers 9 and 10 as well as of the stiffening ribs 13, 14 and of the cross member 1 are designed such that, in this case, only the first chamber 9, i.e., the chamber facing the cross member 1, of the hollow section collapses. If the impact speed, however, amounts to 10 km/h, the second chamber 10 of the hollow section also collapses as shown in FIG. 4. Finally, if the impact speed of the vehicle amounts to approx. 15 km/h, the cross member 1 is also compressed as shown in FIG. 5. Only at speeds exceeding 15 km/h is the longitudinal member 4 or 5 deformed as well.

Figure 6:
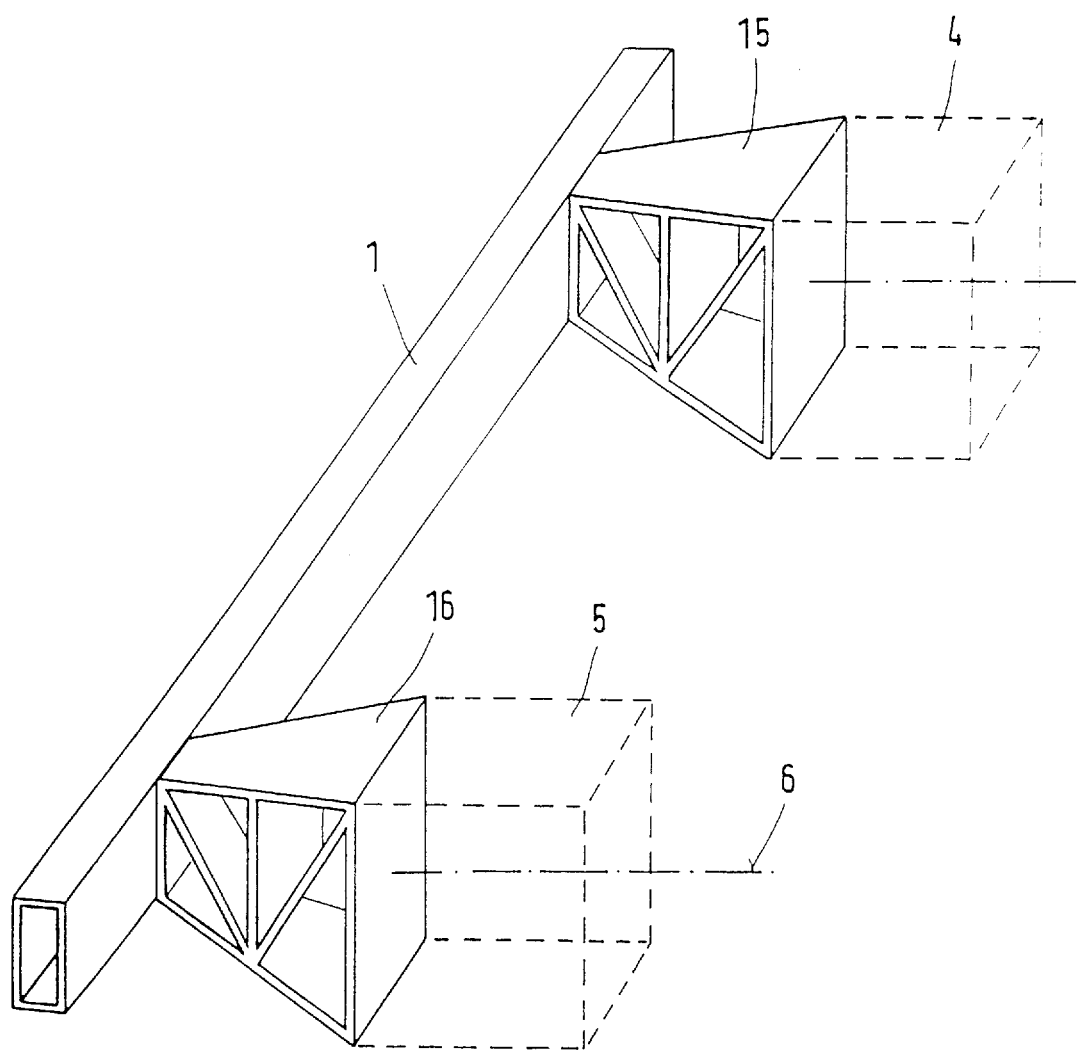
FIG. 6 is a perspective view of a second embodiment of a collision damper according to the invention, with the cross section dimensions both changing in the longitudinal direction of the longitudinal member.

For designing the collision dampers with a view to a predeterminable collision behavior, the outside dimensions of the collision damper can also be changed in addition to the selection of the material, the number of chambers of the profile, the thickness of the chamber walls and, optionally, the design of the stiffening ribs. A corresponding embodiment is illustrated in FIG. 6. Here, the cross member and the longitudinal members are again identified by reference numerals 1, 4 and 5, respectively. As the distance from the cross member 1 increases, the two collision dampers 15 and 16 have an increasing outside dimensions in the two directions which are perpendicular to the longitudinal axis 6.

Figure 7:
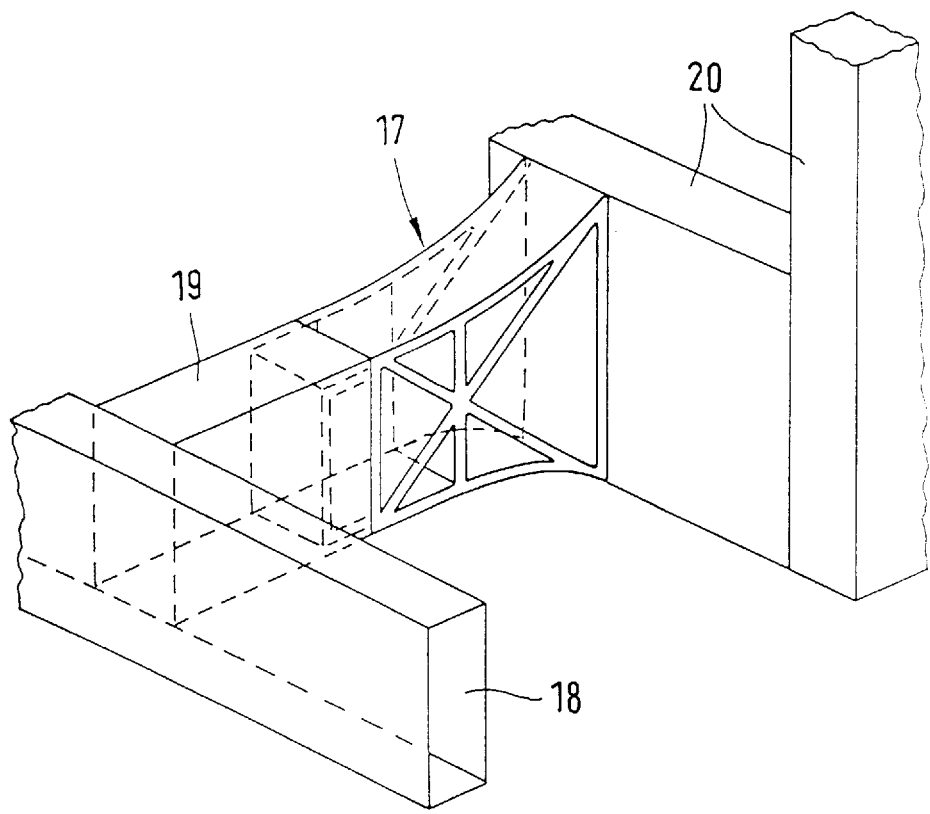
FIG. 7 is a perspective view of a third embodiment of a collision damper according to the invention mounted into a longitudinal member on the end of the longitudinal member facing the passenger compartment; and, FIG. 8 shows an embodiment according to FIG. 7 having an X-shaped profile.

FIG. 7 illustrates an embodiment wherein the collision damper identified by 17 is arranged in-between a longitudinal member 19 connected to the cross member 18 and the passenger compartment 20. As shown the end of the collision damper 17 extends into the hollow interior of the longitudinal member 19. The collision damper 17 is comprised of an extruded profiled section which, due to various re-enforcing ribs, has several chambers arranged next to one another in the longitudinal direction of the longitudinal member 19. In a practical embodiment, the collision behavior of this collision damper 17 was selected such that all chambers of the hollow section had collapsed at an impact speed of approx. 50 km/h, and a deformation of the longitudinal member 19 occurred only at speeds higher than that.

Figure 8:
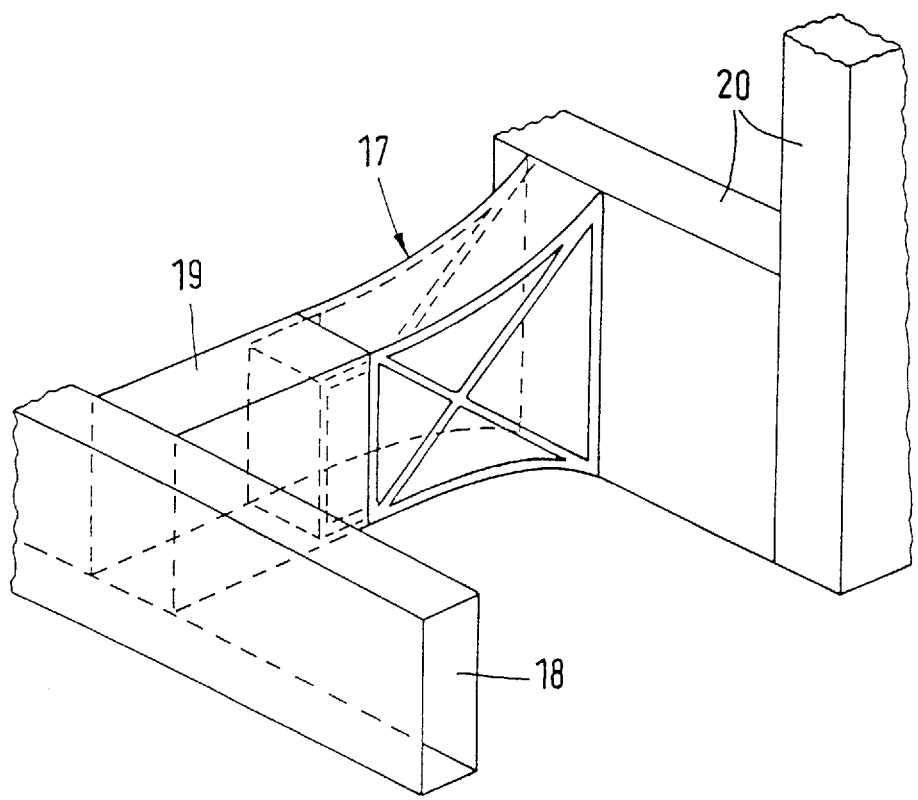

It is understood that the invention is not limited to the embodiments specifically illustrated and described above. Thus, instead of the simple hollow sections, for example, profiled sections having an X-shaped or double X-shaped cross section (FIG. 8) or profiled sections having an asymmetrical design can also be used.

In order to accomplish a precise matching of the collision behavior, it turned out to be of advantage if the collision damper had a modular construction made up of individual, prefabricated extruded sections with optionally different properties, and if the collision damper was specifically tailored to the vehicle which is to be equipped. Furthermore, the collision damper can also be part of a modular longitudinal member which can be put together from a plurality of individual extruded sections, e.g. a plurality of section 2,3, or a plurality of sections with different shapes, such as the collision dampers 2 and 15.

Finally, it is certainly not imperative to change the outer dimensions of the collision dampers in both the x-direction and the y-direction for the matching of the collision behavior, as is shown in FIG. 6, but the dimensions can also be changed in one direction only. Here, the change does not have to extend linearly but can also follow a nonlinear function. All of these variants can be implemented in a straightforward manner by the production of an extruded section and by appropriate trimming.

The invention now being fully described, it will be apparent to one of ordinary skill in the art that any changes and modifications can be made thereto without departing from the spirit or scope of the invention as set forth herein.

What is claimed:

1. A collision damping arrangement for absorbing energy in a possible head-on and/or rear end collision of a motor vehicle, comprising a bumper-side cross member; a plurality of longitudinal members arranged on the cross member and connectable to a corresponding passenger compartment of a motor vehicle; and at least one collision damper for absorbing energy arranged on each longitudinal member; and wherein each collision damper comprises an extruded section whose constant cross-sectional profile extends transversely to the longitudinal axis of the associated longitudinal member for the motor vehicle, with at least one outer dimension of the damper decreasing in a direction toward the cross member.

2. A collision damping arrangement according to claim 1, wherein the extruded section is a hollow section having a square or rectangular cross section.

3. A collision damping arrangement according to claim 1, wherein the extruded section is a hollow section comprised of at least two chambers with the individual chambers being arranged one behind the other in the direction of the longitudinal axis of the corresponding longitudinal member and transversely to the longitudinal axis of the longitudinal member.

4. A collision damping arrangement according to claim 3, wherein the individual chambers of the respective hollow section each have at least one stiffening rib extending in at least one of diagonally, vertically and horizontally.

5. A collision damping arrangement according to claim 4, wherein the cross section of the extruded section decreases in at least one outer dimension in a direction toward the cross member.

6. A collision damping arrangement according to claim 4, wherein the number of chambers, the shape, the wall thickness, the configuration of the stiffening ribs and the material of the extruded section are arranged to provide differing resistance to compression due to impact on the cross member such that, at low impact speeds, first the chamber closest to the cross member is compressed and, at higher impact speeds, also the adjacent chambers of the extruded section are compressed.

7. A collision damping arrangement according to claim 1, wherein the extruded section is a profiled section having at least one X-shaped cross section.

8. A collision damping arrangement according to claim 7, wherein the extruded section is composed of at least two profiled sections, at least one of which has a an X-shaped cross section, arranged one behind the other in the direction of the longitudinal axis of the longitudinal member.

9. A collision damping arrangement according to claim 1, each respective collision damper is a modular assembly of a plurality of individual extruded sections arranged one behind the other in the longitudinal direction, with the number and structure of the individual sections being selected depending on the requirement to be met by the collision behavior of the corresponding vehicle.

10. A collision damping arrangement according to claim 1, wherein the collision damper is a part of a respective longitudinal member which is assembled modularly from a plurality of individual ones of said extruded sections.

11. A collision damping arrangement according to claim 1, wherein the extruded section is made of aluminum or an aluminum alloy.

12. A collision damping arrangement according to claim 2, wherein each respective hollow section has at least one stiffening rib extending in at least one of diagonally, vertically and horizontally.

13. A collision damper according to claim 12, wherein the extruded section is a hollow section comprised of at least two chambers with the individual chambers being arranged one behind the other in the direction of the longitudinal axis of the corresponding longitudinal member and transversely to the longitudinal axis of the longitudinal member.

14. A collision damping arrangement according to claim 1, wherein the cross section of the extruded section decreases in at least one outer dimension in a direction toward the cross member.

15. A collision damping arrangement according to claim 1, wherein each respective collision damper is disposed between the cross member and the associated longitudinal member.

16. A collision damping arrangement according to claim 1 wherein each respective collision damper is disposed at the end of the associated longitudinal member directly connectable to a passenger compartment.

17. A collision damping arrangement according to claim 1, wherein the at least one outer dimension of the damper decreases in a direction toward the cross member between a first end surface facing in a direction toward the cross member and an opposite facing second end surface.

18. A collision damping arrangement according to claim 17, wherein each of said end surfaces is rectangular.

19. A collision damping arrangement according to claim 18, wherein said end surfaces are parallel.

* * * * *